US005095502A

United States Patent [19]

Finzel

[11] Patent Number: 5,095,502

[45] Date of Patent: Mar. 10, 1992

[54] SYSTEM FOR THE DETECTION AND LOCALIZATION OF DEFECTIVE LAMPS OF AN URBAN LIGHTING NETWORK

[76] Inventor: Jean-Luc Finzel, 12 rue de Marokolsheim, Benfeld, France, 67230

[21] Appl. No.: 279,744

[22] Filed: Dec. 5, 1988

[30] Foreign Application Priority Data

Dec. 4, 1987 [FR] France ................ 87 17116

[51] Int. Cl.[5] ........ H04M 11/04; G08B 5/00

[52] U.S. Cl. ........ 379/40; 379/48; 379/51; 379/106; 340/635; 340/641; 340/642; 340/332; 340/331; 340/531

[58] Field of Search ........ 340/635, 641, 642, 332, 340/331, 931, 531; 379/40, 48, 51, 106

[56] References Cited

U.S. PATENT DOCUMENTS 3,715,741 2/1973 McWade ........ 340/642
3,828,334 8/1974 Wallace ........ 340/642
4,549,044 10/1985 Durham ........ 379/40
4,808,982 2/1989 Knapp ........ 340/641
4,856,047 8/1989 Saunders ........ 379/40

*Primary Examiner*—Joseph A. Orsino
*Assistant Examiner*—Kinfe-Michael Negash
*Attorney, Agent, or Firm*—Schwartz & Weinrieb

[57] ABSTRACT

A unit for detection and signalizing of functional defects for public lighting. A unit characterized by the fact that it comprises, for the one part, an emitter module (21) with which each street lamp is equipped, preferably located in its post, at the level of the junction box, the emitter module being equipped with a detector for current consumption (23) using the alternative network of the supply line as the carrier of a detection signal, and for the other part, of a receiver module (22) located in the supply cabinet of the same zone, this receiver module managed by a microprocessor which transmits a defect signal to the control room over a telephone line. This invention is of interest for manufacturers and installers of materials, equipment and components for public lighting.

14 Claims, 5 Drawing Sheets

FIG. 1
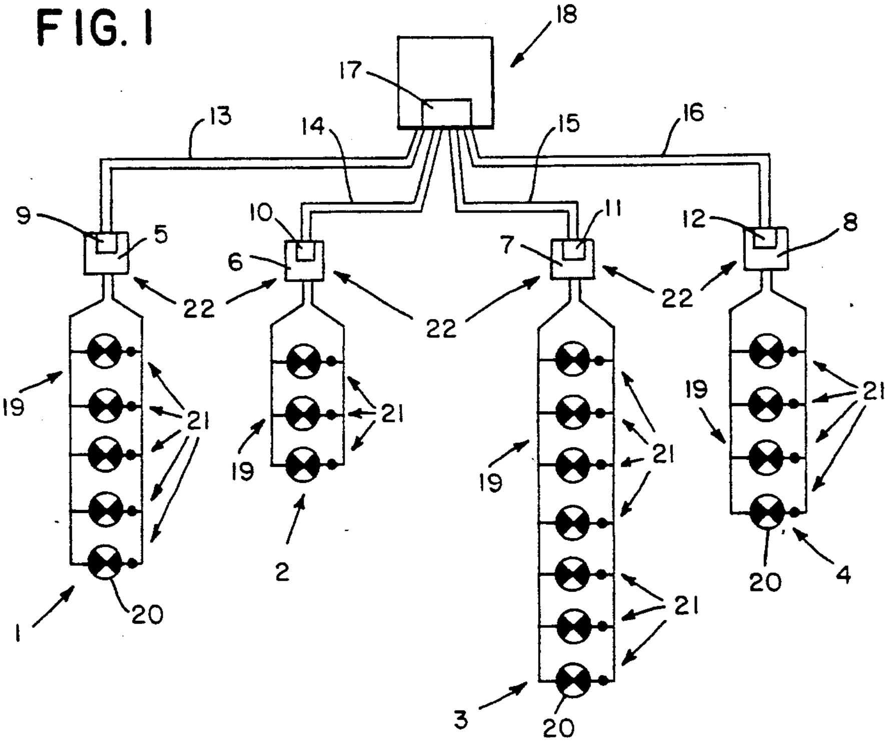
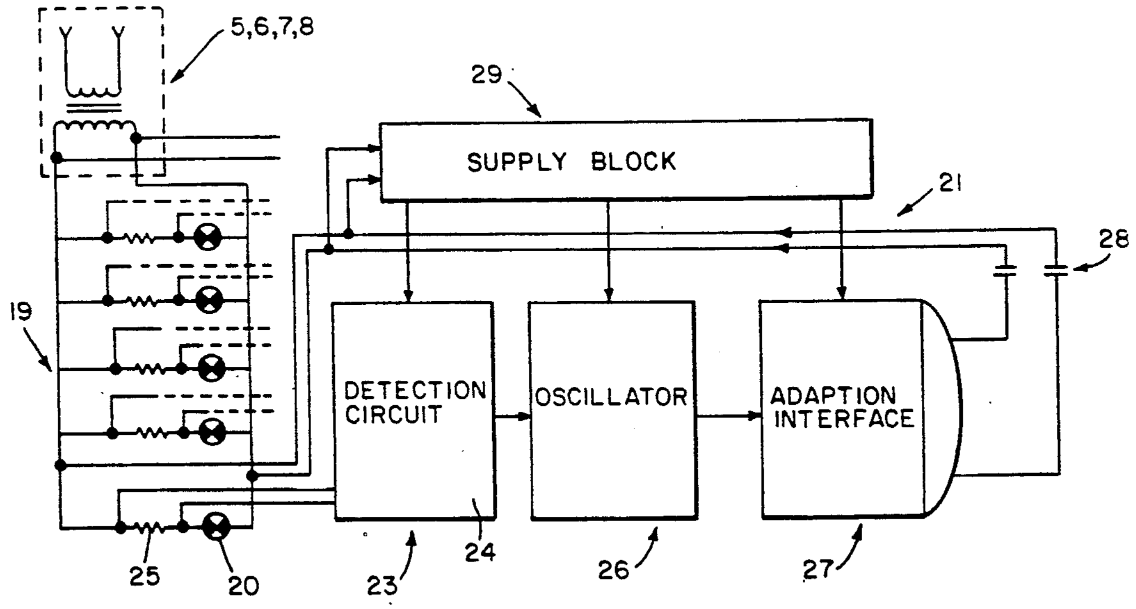
FIG. 2

SYSTEM FOR THE DETECTION AND LOCALIZATION OF DEFECTIVE LAMPS OF AN URBAN LIGHTING NETWORK

The present invention relates to a unit for detection and localization of a functional defect for each defective lighting unit in a lighting network divided into zones.

Checking for functional defects in lighting units, particularly street lamps in public lighting, has not been properly resolved yet.

Purely visual inspection is combined with measurement and checks of electrical consumption.

Although these checks can be naturally and easily automated, it proves to be difficult to identify the defects precisely, and to localize the defective lamp with the aim of programming repair.

This difficulty is furthermore considerably increased with the number of street lamps and the monitoring zones into which they are grouped.

An invention is known which is intended to monitor defects in light sources in a public lighting network globally and individually, and to localize them.

This invention is described in the European patent application No. 0236147, in the name of the french company FORCLUM. It relates to a unit for detection of defects based on the reception of the light flux emitted by a photoelectric or optoelectronic detector. Functioning of this unit is based on a principle of detection which contains the risk of false detections and problems of all kinds.

In fact, any parasitic light can trigger a false alert: car headlights, searchlights, moonbeams, city lights from houses, etc.

Furthermore, placement of the optoelectronic detector, which must be installed near the lamp, proves not to be easy. It is also necessary to provide a two-lead electrical connection from the base of the street lamp to the light source, in order to connect the detector to the assembly.

Finally, the perspective of a multiplicity of applications seems to be significantly reduced.

The present invention has the purpose of alleviating the various inconveniences related to the lack of automation with regard to detection, signalizing of defects and functional failures, and localization of the defective lamps in the public lighting network.

To this end, it relates to a unit for detection and signalizing of functional defects of defective lamps for each lighting unit in a lighting network divided into zones, particularly a public lighting network, characterized by the fact that it comprises, for the one part, an emitter module with which each street lamp is equipped, preferably located in its post, at the level of the junction box, this emitter module being equipped with a detector for current consumption using the alternative network of the supply line as the carrier of a detection signal, and for the other part, of a receiver module located in the supply cabinet of the same zone, this receiver module managed by a microprocessor which transmits a defect signal to the control room over a telephone line. Aside from the aspect of automation, which already constitutes a major advantages in itself, numerous other advantages are noted, such as:

- the dimensions of the emitter module allow it to be easily placed in the post of any existing street lamp; installation and integration of the emitter module are particularly easy, due to the proximity of supply cables for the bulb;
- the receiver module can be perfectly integrated into the transformer cabinet of the zone and is completely protected there;
- utilization of the transmission mode with carrier currents, i.e. by supply cables which are in place, makes it possible to obtain the transmission network required, without any additional electrical connections;
- the cost of implementation and installation is minimal; great capacity for detecting inductive or resistive charges consuming electrical current other than by the bulbs, for example electromagnets, relays, motors, heating resistors, etc.
- absolute identification certainty due to coding;
- connection to any central computer;
- utilization of the same module for a large range of power values;
- possibility of monitoring a large number of zones.

The existence of a numeric version makes it possible to break away from the zone transformers and therefore to adapt to networks supplied directly from a single transformer.

This variation opens applications for all remote monitoring solutions of a network, no matter how the elements and equipment which consume electrical energy are supplied.

It is understood that it offers all the advantages of a numeric version: long-term reliability, insensitivity to certain parasites, better mastery of the sensitivity to variations in ambient parameters, particularly humidity and temperature.

The technical characteristics and other advantages of the invention are given in the description which follows, using as a non-limiting example an embodiment with reference to the accompanying drawings, where:

FIG. 1 is a general schematic view of a complete lighting network connected with a control room;

FIG. 2 is the functional diagram of an emitter module;

In collective or public lighting, the street lamps are supplied in group s, from a transformer located on the street in an electrical cabinet.

Figure 4:
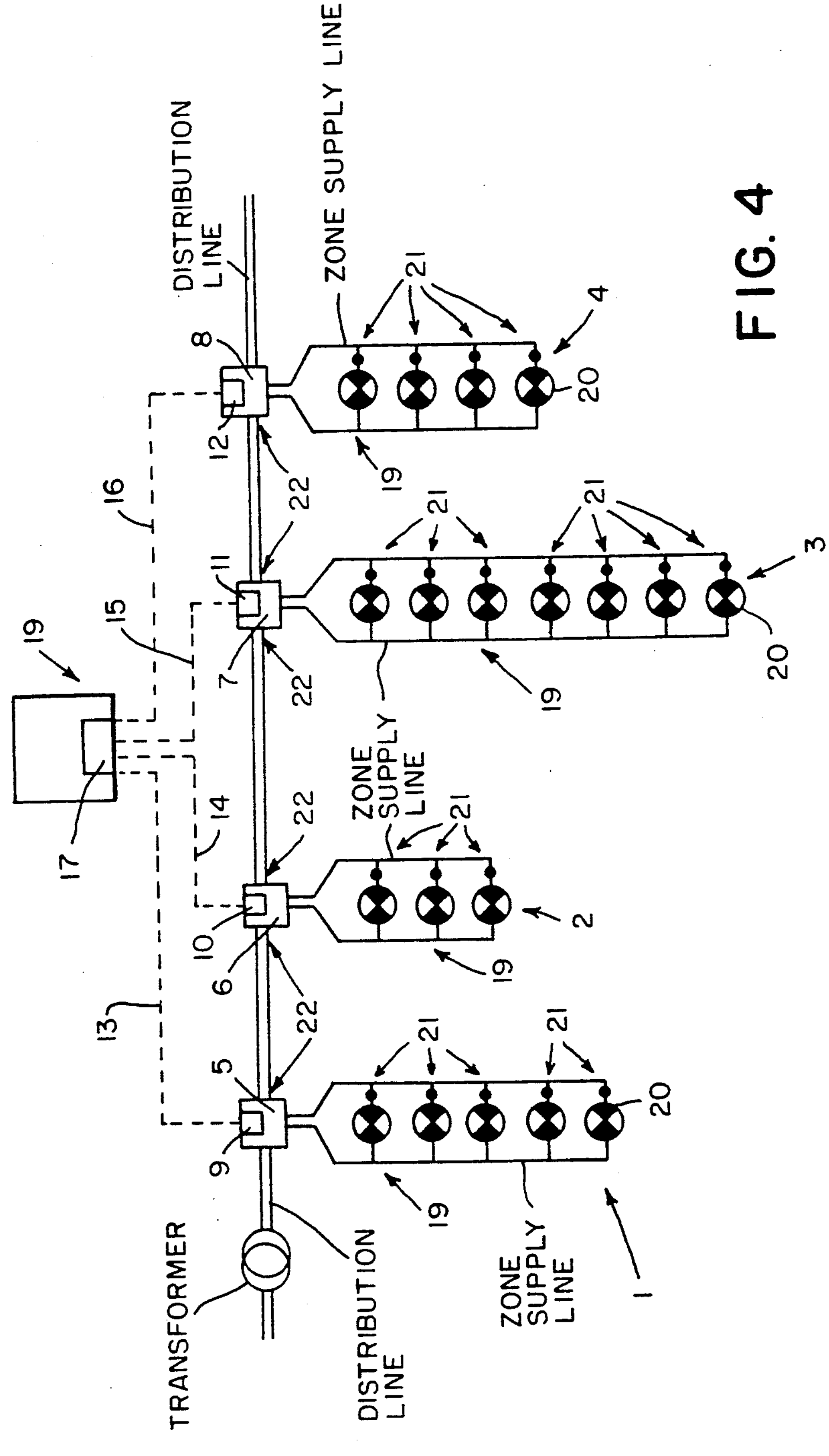
FIG. 4, is a general schematic view of a complete public lighting network with electrical distribution without zone transformers, connected with a network control room, in which the numeric version is being used.

There are also energy distributions from a single general transformer which distributes the energy by a general distribution line, to all the electrical cabinets, as shown in FIG. 4.

In this type of network, the numeric version described above is used.

This electrical cabinet is common to a zone. The number of zones comprising the network is variable, but is usually around forty for a medium size city.

In a general manner, the invention concerns a branching electronic unit intended to detect and signal defects and to localize them in a definitive manner, by reference to zones and rows, by way of a telephone connection to a central monitoring computer in a control room, for each of a large number of street lamps of a public lighting network, and to do this without any connections and lines other than those which already exist, specifically the supply line of the street lamp zone and the telephone line connecting each supply cabinet to the central computer of the control room.

First of all, the version called multi-frequency analog, which uses an individual oscillator at each street lamp, will be described.

More particularly, and with reference to FIG. 1, the unit according to the invention covers a plurality of zones, for example four zones referenced as 1, 2, 3, 4, each supplied by a transformer cabinet such as 5, 6, 7, 8, each connected by an internal telephone interface 9, 10, 11 and 12 and by a telephone line 13, 14, 15 and 16 to a central monitoring computer 17 in a control room 18.

Each street lamp such as 19 of each zone comprises a lighting unit such as 20, for example a bulb, and an emitter module such as 21, located, for example, in its base, supplied by the electrical circuit of the street lamp.

The emitter module is equipped with a detector for current consumption, which drives a connected oscillator on a frequency which is specific to it. The oscillator does not function if the lamp is out of service. This signal, which has a frequency notably different from the rejected alternative one of the 50 Hz network, for example between 5 and 100 KHz, is injected through the electrical line supplying the street lamp, to the supply cabinet, in the manner of carrier currents.

The alternative supply network is used as a carrier, in which one or several supplemental frequencies are superimposed, one on the other, corresponding to lighting failures of each bulb.

As indicated, all the modules of a single zone are each controlled on a different frequency, which makes it possible to differentiate between the signals coming to the supply cabinet.

According to the invention, a receiver module such as 22 is provided in each supply cabinet, to transmit the detection signal to the monitoring computer 17 in the control room 18, after encoding.

This module manages, codes and transmits the detection signals to the computer in the control room, allowing it to localize the defects, then to signal them to the maintenance team.

Now, in the following, the receiver and emitter modules will be examined in their particular functions, particularly according to a first embodiment according to a so-called analog version represented in FIG. 1, 2 and 3.

With reference to FIG. 2, the emitter module comprises a detector 23 for current consumption, for example a voltage detection circuit 24, branched to the terminals of a resistor 25 in series with the bulb.

This current detector drives an oscillator 26. The control of the oscillator is such that it is blocked during current consumption that is considered normal, and emits a signal in case of a failure in lighting, i.e. in the presence of current consumption with an abnormal value.

A frequency is assigned to each street lamp, making it possible to identify it.

This signal with a specific frequency, notably different from that of the network, specific to each street lamp, is injected into the supply circuit of the zone to the cabinet, by an adaptation interface 27, by way of a group of insulating capacitors 28.

The above circuits are connected to a supply block 29 of the network.

Figure 3:
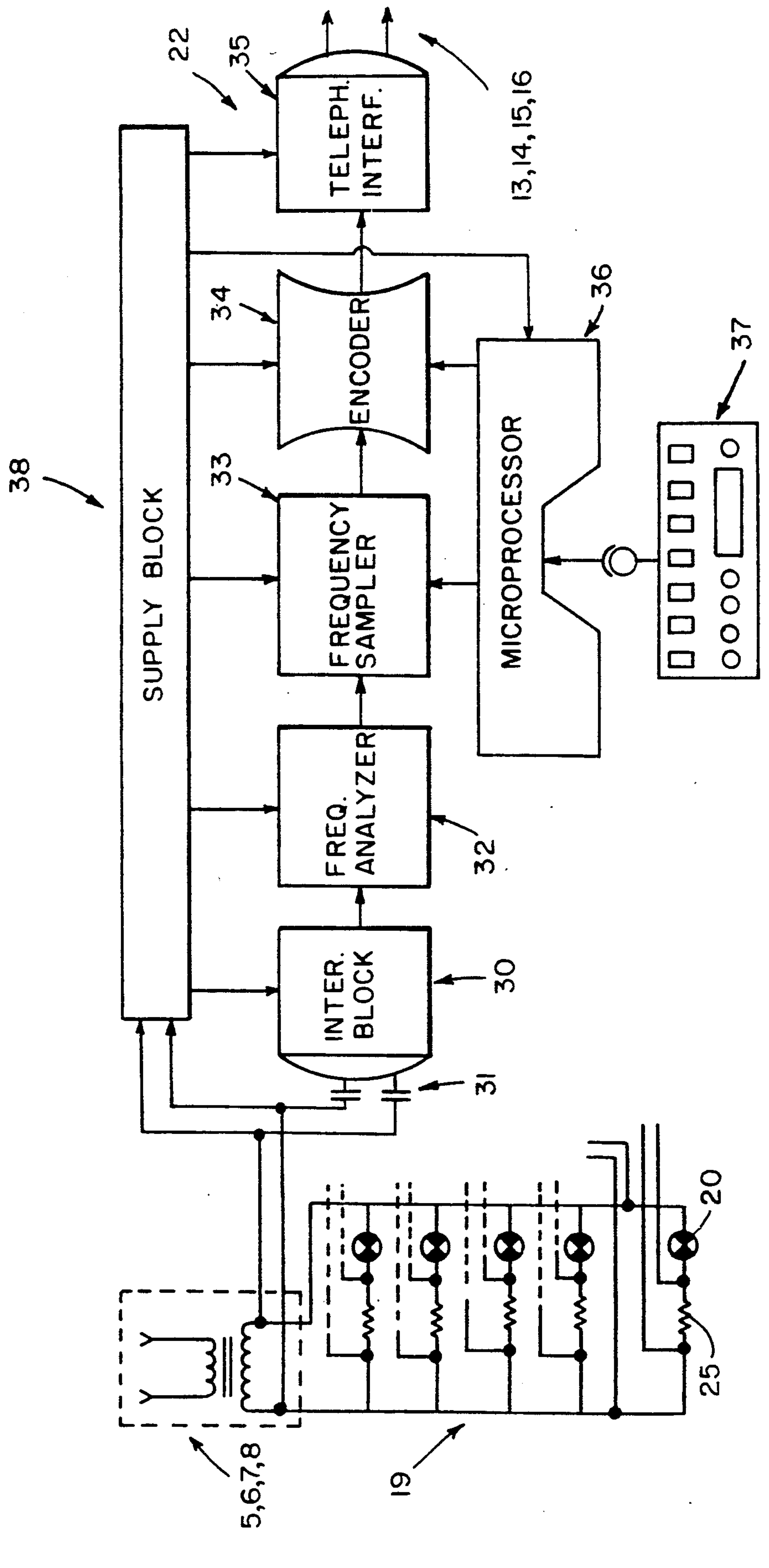
FIG. 3 is the functional diagram of a receiver module.

With reference to FIG. 3, the receiver module 22 comprises first of all an entry circuit comprising a low-voltage interface block 30 insulated from the voltage sector by a group of capacitors 31, then a frequency analyzer 32, a frequency sampler 33, followed by an encoder 34 transmitting the coded information over the telephone line of each cabinet by way of a telephone interface 35.

The receiver module 22 is managed by a microprocessor 36 connected to a plug-in keyboard 37. This microprocessor controls the sampler 33 and the encoder 34 for transmission of the information over telephone lines.

As above, a supply block 38 provides the supply current to various circuits.

The encoder 34 assigns a code composed of two letters and four numbers to each recognized frequency. The first two letters and the first two numbers are reserved for the zone which it represents, and the last two numbers to the row of the bulb in question.

Now, the functioning of the unit will be discussed, with reference to FIG. 1, 2 and 3.

The lighting defect is translated into abnormal consumption of the street lamp involved.

When voltage is applied, the consumption detector does not control the oscillator, which gives off a frequency signal specific to the lamp with the non-functioning bulb.

This frequency is transmitted by carrier current on the line, to the receiver module, whose frequency analyzer detects the presence of this frequency.

The sampler, upon instructions from the microprocessor 36, is going to emit a signal which will be coded as a function of the frequency received, which makes it possible to identify the street lamp.

The coded signal is transmitted on the telephone line, to the central computer, which can thus identify the street lamp and direct the repair and maintenance teams to the zone of the street lamp with the defective bulb.

Now, the so-called numeric version will be described, with reference to FIG. 4, 5 and 6.

According to the first embodiment described above, the frequency of the emitter module oscillator signal is notably different from that of the electrical supply network.

This, the oscillator signal is strongly and sufficiently attenuated by the coils of the zone transformer contained in a cabinet for each zone.

Insulation of the defect signals between the zones is therefore assured.

The situation is completely different for lighting networks without zone transformers, in which electrical insulation for the frequencies of detection signals emitted cannot be provided by the coils of the zone transformers, since these do not exist, the network being supplied globally by a single transformer.

The difficulty is therefore, in this case, to be able to selectively identify the identical frequency or frequencies emitted by the different zones, and to assign them respectively to the zone or zones in question, since all the energy sources of the zones are electrically connected in parallel to the same single general transformer, without insulation for the said frequencies.

The numeric variation described below has the purpose of alleviating this inconvenience by substituting a microprocessor with an oscillator for the emitter module, which carries out the encoding directly. According to this coding, a first code, called the row code, is assigned to each lighting unit of each zone, carried to the zone cabinet by the carrier current, then supplemented by a second code called the zone code, the complete code being transmitted over telephone lines to a central monitoring station.

This modification makes it possible to make the invention independent of a zone transformer or transformers, not only for all types of lighting networks, but also for all types of electrical energy distribution networks, such as signalizing lights and traffic control lights, and, more generally, distribution of electrical energy.

With reference to FIG. 4, the unit to which the present improvement is applied covers a plurality of zones, for example 1, 2, 3, 4, each supplied by way of supply cabinets and regrouping, without a transformer, referenced by extension of the same manner as above, 5, 6, 7 and 8, each connected by an internal telephone interface 9, 10, 11 and 12, known by the designation of MODEM, and by a telephone line 13, 14, 15 and 16, to a central monitoring computer 17 in a control room 18.

In this case, the lighting network is electrically supplied by a single transformer by way of a general distribution line.

Each street lamp such as 19 of each zone is equipped with a lighting unit such as 20, for example a bulb, and an emitter module such as 21, preferably located in its base, at the level of the junction box, and supplied by the electrical circuit of the street lamp on the zone line.

The emitter module 21 comprises a detector for current consumption, which provides, according to this variation, the information of a current consumption status to a microprocessor MP, which processes this information and directly generates the numeric code for the row, for identification and localization, the code being assigned to each lamp or each street lamp of this zone. The expression of this code is a coded word represented by several bits.

The microprocessor MP only generates the coded row word if the consumption of the lamp is considered abnormal, corresponding to a failed lamp, with this information being communicated, as indicated above, to the microprocessor MP by the current detector.

This numeric signal is carried by the zone line, from the emitter module 21 to a receiver module 22, by utilization of the said technique of carrier currents, along the feed line of each zone.

For reasons of technical efficacy and increased carrying capacity, the numeric signal corresponding to the coded row word modulates a carrier which is injected into the supply line.

According to this variation, each receiver module 22 of each zone generates a zone code and transmits the complete code to the central monitoring computer 17 in the control room 18, by way of a telephone line.

This receiver module generates and transmits only numeric signals or coded words to the computer 17 in the control room 18, allowing it to localize the defects, and then to signalize them to the maintenance team.

Now, in the following, the receiver and emitter modules will be examined in their particular functions.

Figure 5:
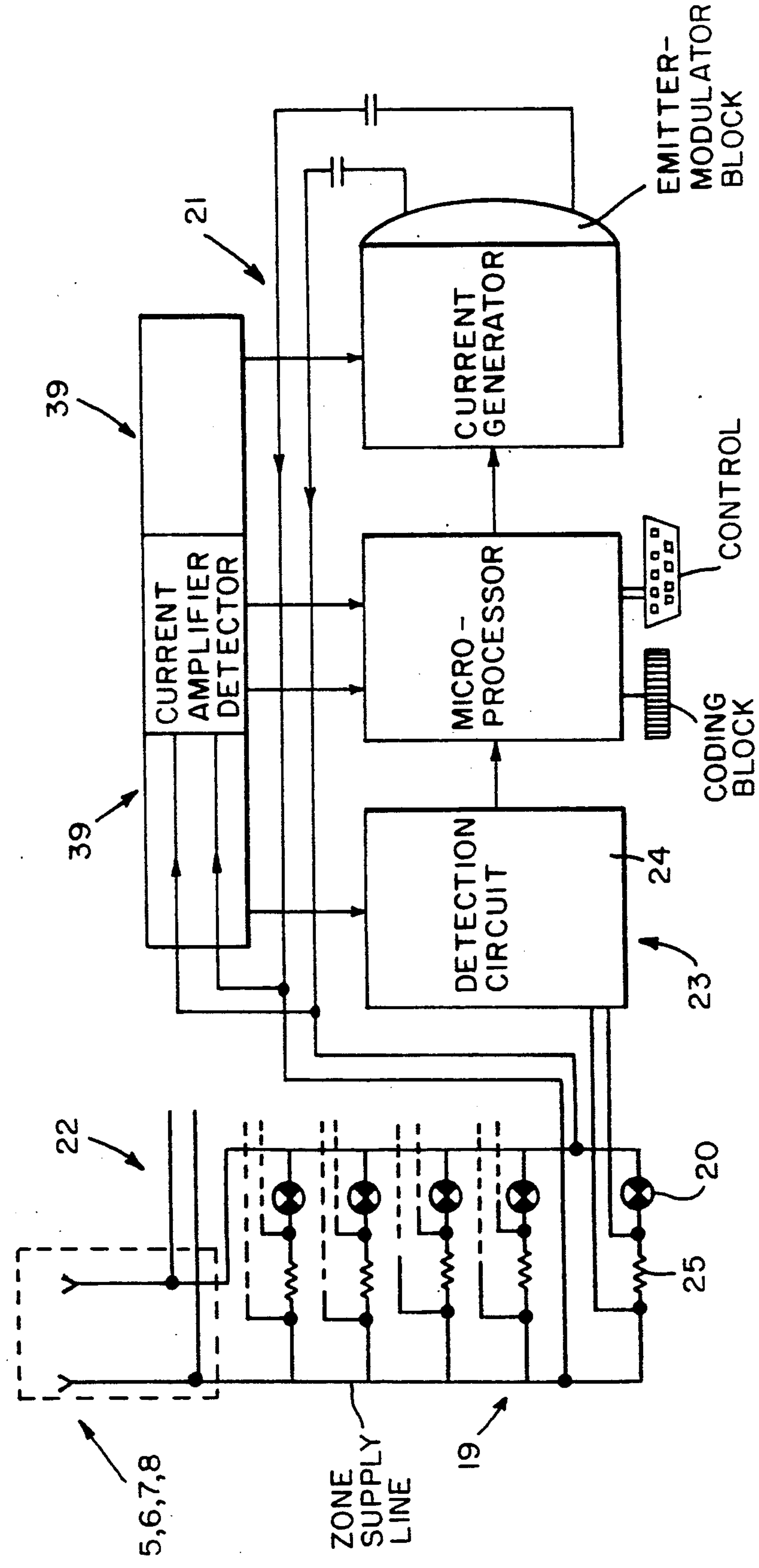
FIG. 5 is the functional diagram of the emitter module in the case of the numeric version.

With reference to FIG. 5, the emitter module 21, located in the existing junction box at the base of each street lamp, comprises first of all a detector 23 for current consumption, for example a voltage detection circuit 24, branched to the terminals of a resistor 25 in series with the bulb 20. This emitter module then comprises a microprocessor MP programmed according to the work sequences and connected to a numeric row coding block with integrated coding microswitches, with the microprocessor also being connected with a row number, i.e. lamp number reading connector, for branching of a removable hexadecimal display of the control. A carrier current amplifier-detector ADP branched on the supply line of the zone completes the entry circuits by way of a transmission/reception commutator switch controlled by the microprocessor MP.

The numeric row coding blocks CODNR and those of the zone are provided to introduce the identification and localization code and the zone designation code of the lighting unit once for all of them.

The function exit blocks specific to this assembly are limited to a carrier current generator with a frequency on the order of 100 KHz and to an emitter modulator enclosed on the line by way of a suitable low-frequency insulation.

The unit is supplied from the network by suitable supply blocks 39.

The current detector 23 provides the microprocessor MP with the information concerning the current consumption status. The microprocessor processes this information, and, depending on the value of the status, generates the coded word which makes it possible to identify and localize the defective lamp.

The identification code specific to each street lamp or row code is used to modulate the carrier current by the emitter-modulator block EMM to inject it into the supply line of the zone LAZ to the regrouping cabinet.

The carrier current, suitably modulated by the coded row word, coming from the computer MP, follows the supply line of the zone, and is received at the end of the line by the receiver module corresponding to the zone in question, and then demodulated. A supplemental zone code is added to the coded row word, then the entire code is sent to the monitoring computer 17 in the control room 18 by the receiver module and its MODEM.

Figure 6:
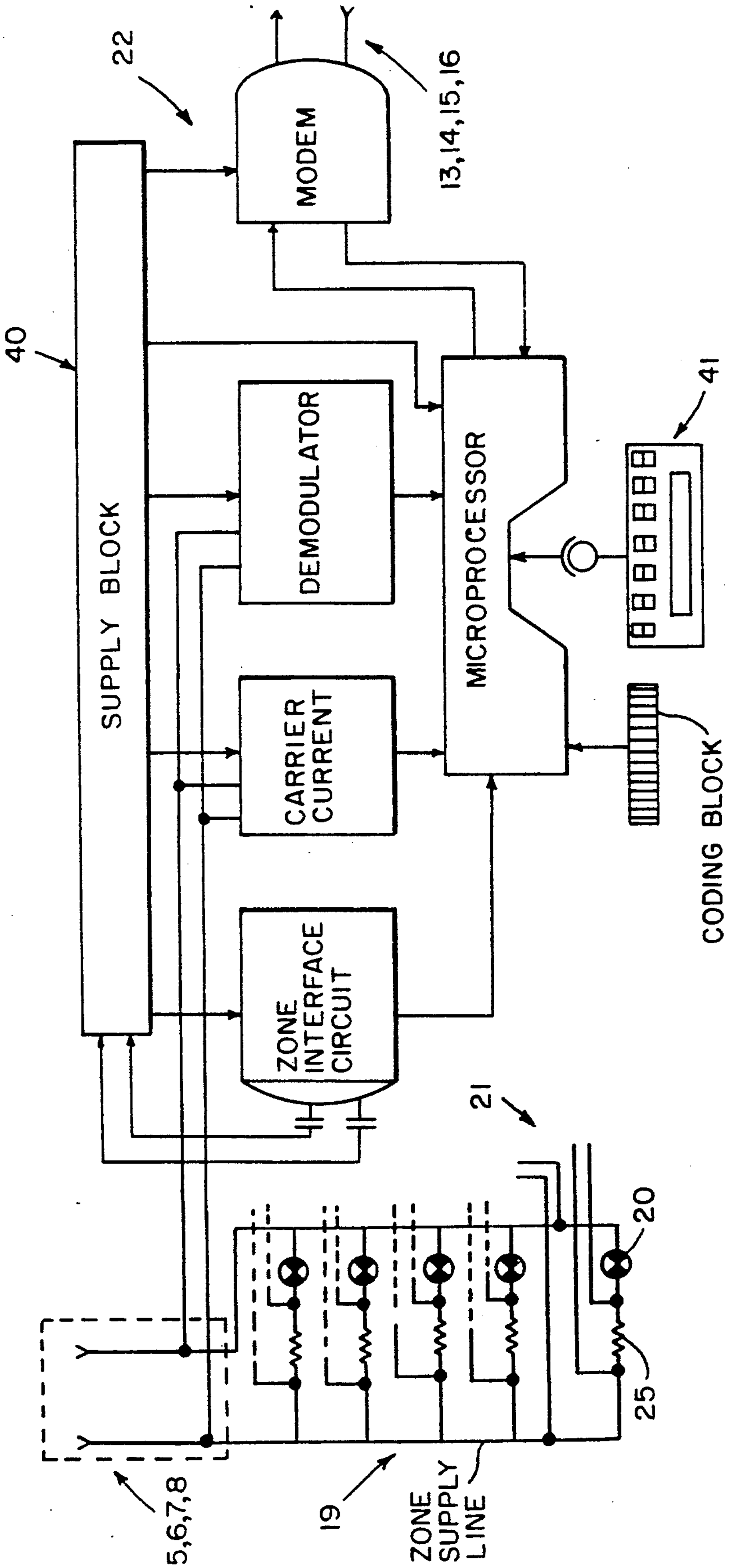
FIG. 6 is the functional diagram of the receiver module in the case of the numeric version.

With reference to FIG. 6, each receiver module 22 comprises first of all a supply block 40 which provides supply current to the various circuits, then a zone interface circuit and a recognition circuit for the carrier current, and a demodulator block.

The receiver block 22 is managed by a second microprocessor MPC, an EPROM memory, connected to a numeric coding block for introduction of the zone code and a display 41 for reading it.

This microprocessor MPC recognizes the carrier and rejects all the other signals with a different frequency. It receives the coded demodulated signal and manages its transmission to the monitoring computer 17 over the telephone lines 13, 14, 15, 16 by way of a telephone modulator-demodulator circuit MODEM.

As far as the row code is concerned, the microprocessor MP generates a code with seven bits, in the example selected, to designate the lamp in the zone in question. This allows the remote monitor to function with one hundred twenty-eight lighting units per zone. Then, a zone code of twelve bits is adopted, generated by the MPC to designate the zone, which allows four thousand ninety-six remote monitored zones, which is a total maximum number of five hundred twenty-four thousand two hundred eighty-eight lamps monitored by remote monitoring in a network.

This limits appear large. However, they do not constitute the limits of the system. These are, in fact, tied in the management capacity of the central monitoring computer 17, in other words with purely technological limits.

Now, in general terms, the functioning of the base assembly unit corresponding to this numeric variation will be discussed, with reference to FIG. 4, 5 and 6.

The functional failure of a lighting unit is detected by abnormal consumption of the street lamp involved.

When voltage is applied to the lighting unit, in the case of a defective lamp, the current consumption detector 23 in question transmits a consumption status signal to the microprocessor MP, which is compared, analyzed and considered as abnormal, i.e. translating into a functional defect. The microprocessor MP, after verifying the absence of a carrier current on the line, the carrier current possibly coming from an adjacent emitter module of the zone, generates the coded row word specific to the defective lamp, i.e. corresponding to its identification and its localization in the zone.

The carrier is modulated by the coded row word and injected into the supply line of the zone.

The receiver module of the zone cabinet receives this modulated carrier, and, after suitable demodulation and addition of the zone code by the microprocessor MPC, the receiver module sends the complete coded word to the monitoring computer 17 over the telephone line in question, by way of the MODEM block.

The coded word is understood to be the word comprising the lamp number which the MP computer communicates, to which the zone number assigned by the MPC has been added.

After reception and decoding, the computer 17 signals the zone and the street lamp in question to the maintenance team.

Replacement of the defective lamp can therefore be carried out within a minimum period of time, since the time for finding it is practically zero.

I claim:

1. A unit for detection, localization, and signalizing of functional defects of each lighting unit in a lighting network divided into zones (1,2,3,4), particularly a public lighting network, comprising a zone supply line coming from a cabinet (5,6,7,8), with the zones furthermore each being connected with a central electrical supply and with a central monitoring computer (17) in a control room (18), characterized by the fact that said unit comprises, for each zone:

- an emitter module (21) with which each street lamp is equipped, said emitter module being equipped with a detector (23) for detecting current consumption and for emitting a detections signal characteristic thereof; and
- a receiver module (22) managed by means of a microprocessor which transmits a defect signal to the control room over a telephone line connecting each zone to the monitoring computer (17), for the purpose of intervention by a maintenance team.

2. A unit according to claim 1, characterized by-the fact that the signal of the detector (23) for current consumption drives a frequency oscillator specific to each lighting unit of the same zone, the frequency sent on the supply line to a zone cabinet.

3. A unit according to claim 1, characterized by the fact that the receiver module (22) provided in a supply cabinet (32) comprises a frequency sampler and analyzer (32) followed by an encoder (34) for transmission by way of the telephone line or lines of the coded information corresponding to signalizing of the defects and their localization to the computer in the control room, the receiver unit being driven by a microprocessor (36).

4. A detection unit according to claim 1, characterized by the fact that the detector (23) for current consumption of the emitter module (21) is a voltage detection circuit (24); branched to terminals of a resistor (25) in series with a bulb of the lighting unit.

5. A detection unit according to claim 4, characterized by the fact that the signal of the said detector (23) for current consumption controls an oscillator by failure of voltage at the terminals of the resistor (25).

6. A detection unit according to claim 2, characterized by the fact that the frequency analyzer (33) of the receiver module (22) detects the presence of one or more frequencies emitted by the emitter module or modules (21) of the zone in question and by the fact that the encoder (34) assigns a code to each recognized frequency.

7. A detection unit according to claim 6, characterized by the fact that the code is comprised of two letters and four numbers, the first two letters and the first two numbers being reserved for the zone which they represent, and the last two numbers for a row of the zone of the bulb in question, corresponding to the frequency detected.

8. A detection unit according to claim 3 characterized by the fact that the receiver module (22) is managed by a microprocessor (36) connected to a plug-in keyboard (37), the said microprocessor controlling the sampler (33) and the encoder (34) for the purpose of transmitting the information by way of the telephone lines.

9. A detection unit according to claim 1, characterized by the fact that the frequency of the signal of the emitter module (21) is notably different from that of the electrical supply network.

10. A unit according to claim 1, characterized by the fact that the emitter module (21) comprises a microprocessor MP which generates a row code for identification and localization directly to the receiver module (22) when the status of the detector (23) communicates a functional failure of the unit (20) to the microprocessor, this code being modulated by a carrier current and carried by the electrical supply lines of each zone, and by the fact that the receiver module (22) comprises an interface, a demodulator block, managed by a second microprocessor, which completes a complete code word to be sent to the monitoring computer by a MODEM over a telephone line, by assigning a zone code.

11. A unit according to claim 10, characterized by the fact that the code for identification and localization of the lamp is introduced into the microprocessor Mp.

12. A unit according to claim 10, characterized by the fact that the code for identification and localization of the zone is introduced into the microprocessor MPC.

13. A unit according to claim 10, characterized by the fact that the emitter module (21) comprises an amplifier-detector circuit ADP for the carrier current.

14. A unit according to claim 10, characterized by the fact that the unit further comprises a recognition circuit REP for recognition of the carrier current.

* * * * *